May 5, 1942.　　　　B. CASTIGLIA　　　　2,281,555
KNEE ACTION COMPENSATOR
Filed Nov. 24, 1939　　　　2 Sheets-Sheet 1
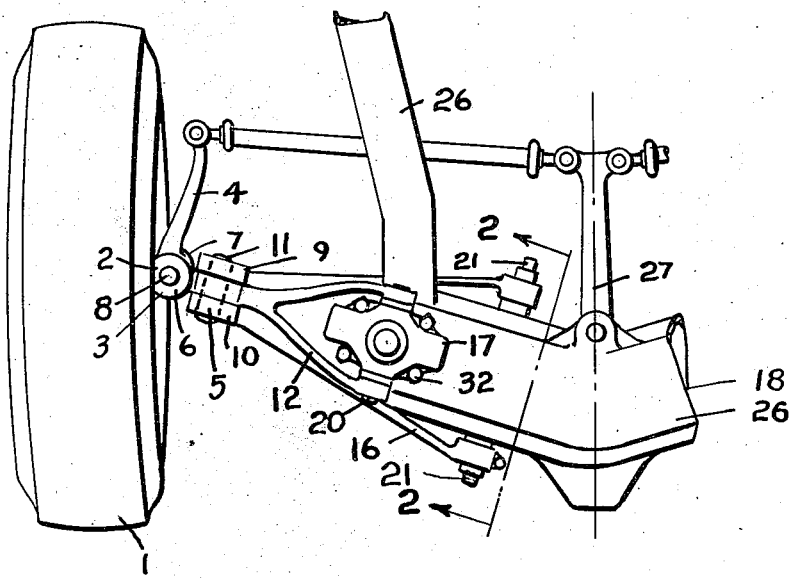
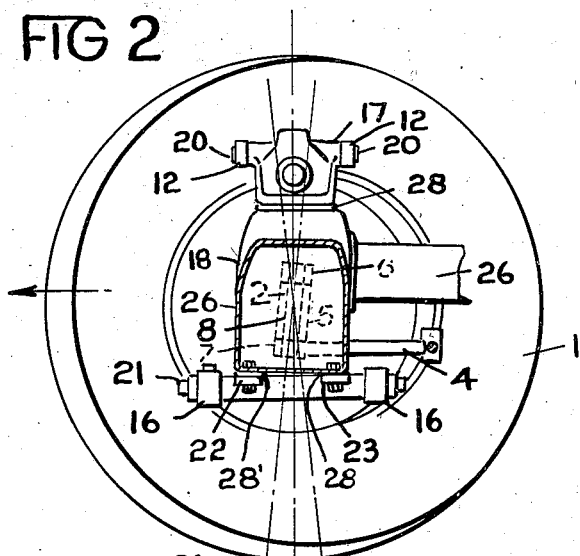
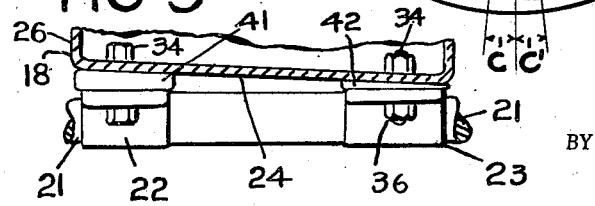
INVENTOR.
BIAGIS CASTIGLIA.
BY Paul A. Talbot.
ATTORNEY.

May 5, 1942.  B. CASTIGLIA  2,281,555
KNEE ACTION COMPENSATOR
Filed Nov. 24, 1939  2 Sheets-Sheet 2
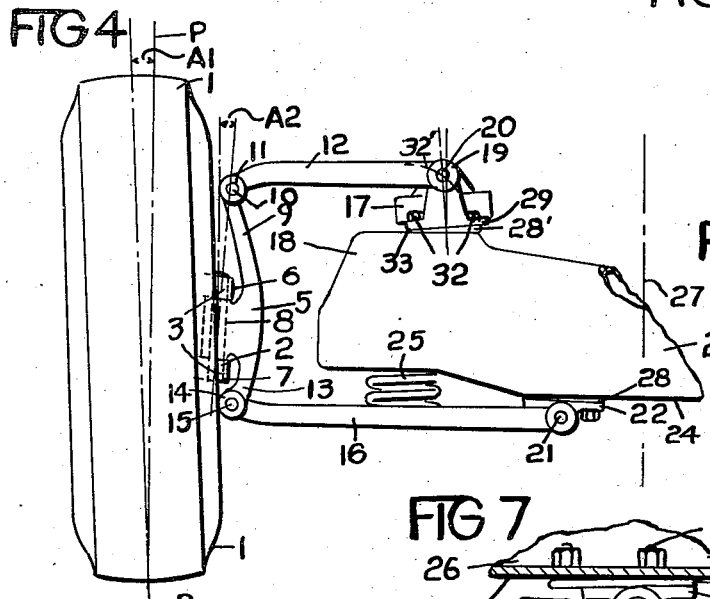
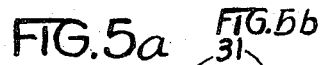
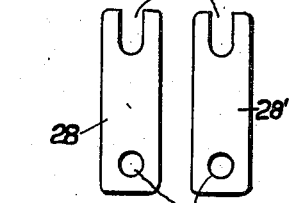
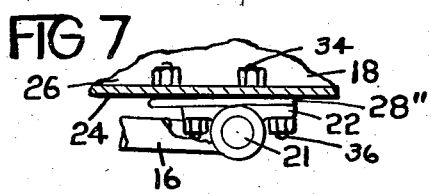
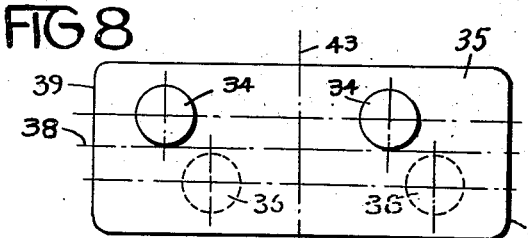
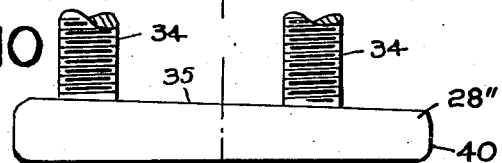
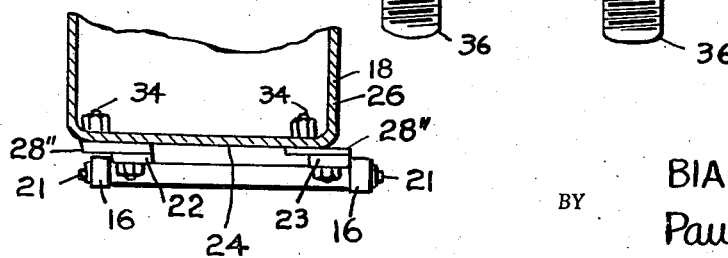
INVENTOR.
BIAGIS CASTIGLIA.
BY
Paul A. Talbot.
ATTORNEY.

Patented May 5, 1942

2,281,555

UNITED STATES PATENT OFFICE 2,281,555

KNEE ACTION COMPENSATOR

Biagis Castiglia, New York, N. Y., assignor to Wheel Aligning Necessities, Inc., New York, N. Y.

Application November 24, 1939, Serial No. 305,851

18 Claims. (Cl. 280—96.2)

My invention relates to devices to compensate and adjust the caster and camber of knee action connected wheels and has among its purposes and objects to provide:

A simple device which will correct misalignment of knee action wheel mounts.

A convenient and inexpensive knee action compensating device.

A compensating device which combines a shim and wedge or excentric studs.

A quick means of adjusting knee actions.

I accomplish these and other objects by the construction herein described and shown in the accompanying drawings forming a part hereof in which:

Fig. 1 is a plan view of one side of a front axle and knee action.

Fig. 2 is a section at 2—2 Fig. 1.

Fig. 3 is an enlarged detail of the pivot shaft showing the compensator in place.

Fig. 4 is an elevation of one side of the front axle and knee action showing my compensators in place.

Fig. 5a is a plan view of a compensator.

Fig. 5b is a plan view of another compensator.

Fig. 6a is an end elevation of the compensator shown in Fig. 5.

Fig. 6b is an end elevation of the compensator shown in Fig. 5.

Fig. 7 is an enlarged detail of the pivot shaft showing the application of the modification of my compensators shown in Figs. 8, 9 and 10.

Fig. 8 is a plan view of a modificatin of a compensator.

Fig. 9 is an end elevation of a modification of a compensator.

Fig. 10 is a side elevation of a modification of a compensator.

Fig. 11 is an enlarged detail showing the application of the compensator shown in Figs. 8, 9, and 10.

Fig. 12 is an elevation of a modification.

Similar reference characters refer to similar parts throughout the several views of the drawings and in the specification to follow:

In the alignment of vehicle wheels mounted on what is commonly known as a knee action, the adjustment and proper angles of the caster and camber of the wheels which are moved to steer the vehicle is of importance.

Inaccuracies of the frame caused by the permanent set or seasoning of the materials, accidental distortion and bending of the frame and other causes make the adjustment of the caster and camber of vehicle wheels necessary. Correcting these defects by bending the parts is difficult and costly and the various methods now used need not be enumerated here in detail nor is it necessary to point out the merit of aligning the wheel to have a caster or camber of a definite angle for best results desirable as the angle for one vehicle may be unsuited for another make or type of vehicle.

Authorities also are not agreed upon the exact angle of the caster and camber to be most effective, and the angle has been changed by practice and experience.

The wear on tires, ease of steering, the speed of the vehicle, balance and road holding qualities are among the considerations to be determined in establishing the proper caster and camber.

Caster and camber are both terms given for the angle from the perpendicular at which the king pin is disposed in addition to its inclination. The caster angle is measured in relation to the lengthwise or travel direction of the vehicle while the camber angle is cross wise of the vehicle and causes the tread of the wheel to rest off of true center. The centers of the treads between two front wheels is usually closer at the road than at the top of the wheels when aligned to the proper camber.

Knee actions are constructed in numerous ways but in general comprise the following characteristics:

The wheel and the king pin on which it swings in steering the vehicle is positioned in the steering knuckle having an arm moved by the operator at the steering wheel of the vehicle. The other part of the steering knuckle, the steering knuckle support, supports the weight of the vehicle and extends above and below the knuckle and at the top end is pivotally secured to the upper control arm and at the bottom to the lower control arm. The other end of both the upper and lower control arms are pivotally connected to the axle frame or chassis front frame and this is connected to the other parts of the chassis, body, etc.

The springs and shock absorbers are interposed between and effect the movement of the control arms and thus the movement of the wheels in supporting the vehicle.

The movement of the center of the pivotal connections of the control arm in relation to the frame changes the caster and camber, and I have provided a simple way of accomplishing this movement of these centers which, combined with the usual parts, as above mentioned, forming the knee action, constitute my invention.

I am aware that adjustments are provided for correcting the camber to a limited degree, but these do not serve the requirements met in practice for aligning many vehicle wheels.

I have herein shown in detail one of the constructions in which the principles embodied in my invention are illustrated. The construction in its details may be modified to adapt my invention to the various knee actions, and to those skilled in the art to which it pertains, such modifications may be apparent after a study of this detailed disclosure.

I have shown a typical front wheel 1 of a passenger automobile and a knee action 2; the other wheel and knee action for the other side of the automobile is not shown as it is in most respects similar.

The wheel revolves on its axle and bearings in the usual manner and the axle is secured to or formed integral with the knuckle joint member 3 to which is secured the steering arm 4 and the steering knuckle support or member 5 is connected between the upper and lower ends 6 and 7 by the king pin 8 permitting the member 3 and the wheel 1 mounted on it to swing as desired to steer the vehicle. The member 5 is provided with the upper arm 9 terminating into the pivotal joint 10 through which the pin 11 passes connecting the upper control arm 12. The member 5 is provided with the lower arm 13 which terminates in the pivot joint 14 through which the pin 15 passes thereby pivotally connecting one end of the lower control arm 16 to said member 5.

The upper control arm 12 is pivotally connected to the shock absorber 17 and the top of the axle frame or chassis 18 by the joint 19 through which the pin 20 passes. The upper control arm thus provides a connecting link free at both ends to move vertically in relation to either the wheel or axle frame.

In like manner, the lower control arm 16 is pivotally connected to the bottom of the axle frame 18 by the pivot shaft 21 and the lugs or brackets 22 and 23 secured to the under side 24 of the frame 18. The shock absorber 17 restricts and controls the movement of the upper control arm and the spring 25 which rests at one end on said lower control arm and at its other end in the frame 18, controls the movement of the lower control arm and supports the frame 18, chassis 26, and parts secured to it.

The location of the center of the pivot shaft 21 and the location of the center of the pin 20 in relation to the frame 18 determines the caster and camber of the wheel 1; thus by moving the pin 20 away from the center 27 of the frame 18 the camber of the wheel is increased by inclining the king pin less and the camber angle A1 more from the perpendicular as shown by the line P. It is to be noted that the inclination of the king pin A2 is opposite in relation to the perpendicular than the inclination or angle of the camber A1.

The camber may also be changed by changing the distance between the center of the frame 27 and the center of the pivot shaft 21; thus the movement of the brackets 22 and 23 toward the center 27 will increase the camber.

Referring to Figure 4 of the drawings, the pin 20 is moved away from the center line 27 by tilting the shock absorber 17 by means of the compensator 28 which may be tapered and of a thickness to raise the edge 29, and in Figure 5 I have shown the compensator in two parts 28 and 28' each provided with the appertures 30 and slots 31 which receive the bolts 32 of the shock absorber which clamp the compensator between it and the frame 18 causing the pin 20 to move along the line 32' which is an arc, having its radial center at the edge 33.

Referring to Figs. 7, 8, 9, and 10, I have shown the compensator 28" one of which is inserted between each of the brackets 22 and 23 and the bottom of the frame 18. The compensator 28" is provided with the integral studs 34 on its upper surface 35, and the studs 36 on its lower surface 37. The studs 34 are spaced at a distance or offset from the center line 38 toward the edge 39 and the studs 36 are offset from the center-line 38 toward the edge 40 of the compensator. When the studs, which are disposed out of axial alignment one above the other, engage the apertures in the frame and brackets, the bracket will be moved away or toward the centerline 27, a distance equal to the distance between the axial alignment of the studs or double the distance the studs are positioned relative to the centerline, 38. The compensator thus secures the knee action to the frame as well as adjusts it.

It will thus be seen that the camber may be adjusted by tilting the shock absorber 17 to move the center of the pin 20, or by moving the brackets 22 and 23 and the pivot shaft 21.

The caster may be adjusted by tilting the brackets 22 and 23 and the pivot shaft 21 by means of the wedge shape compensators 41 and 42 or by shifting the brackets in relation to the frame 18 by the compensator 28" and the location of the studs 34 and 36 in relation to the center line 43 in much the same way as the camber is changed by reason of the position and relationship of the studs 34 and 36 to each other.

The caster is the angle from the perpendicular the king pin is inclined toward the front or back, and is shown in Fig. 2 of the drawings. A positive caster C is when the king pin is inclined backward, and a negative caster C' is when the king pin is inclined forward. The front or normal direction of travel is designated by the arrow.

In some cases the wedge shaped compensators may also be provided with studs positioned on their top and bottom surfaces which are not in axial alignment. In such cases, the brackets securement, pivotal connections or other connecting means for the lower or upper control arms are tilted as well as re-positioned in relation to the axle frame. The studs engage holes in the frame and bracket where through bolts may have been used to secure the brackets, etc., to the axle frame. The distance the brackets, etc., are moved from their original position is determined by the distance the top and bottom studs of the compensator are out of axial alignment, and the angle of caster and camber may thus be adjusted or corrected by the use of compensators having the desired thickness, taper and for misalignment of the studs. The shape and sizes of my compensators may vary to suit the various types of knee action mountings or the mountings of similar devices for providing independent movement for the wheels which guide the direction of movement of the vehicle.

In Fig. 12, I have shown a modification in which the compensator 44 is made by offsetting the ends of a stud. This compensator may be used when the amount to be adjusted is small.

The stud compensator may be offset changing the axial center line of one end as compared with the other end at a point between the ends.

Various modifications may be made from the detailed disclosure herein shown and described, and I do not wish to be limited to this disclosure which illustrates my invention as I may wish to depart from the details within the scope of the appended claims which set forth my invention.

I claim:

1. In a knee action comprising a vehicle wheel, a knuckle joint and king pin swingingly mounting said wheel in said knuckle joint, a steering knuckle support having an upper and lower arm and pivotal connections at the ends thereof, and upper and lower control arms connected to said pivotal connection, an axle frame having said control arms pivotally connected thereto, and wedge shaped compensators inserted between said axle frame and said upper pivotal connection tilting said pivotal connection of said upper control arm in relation to said axle frame to change the camber of said vehicle wheel.

2. In a knee action comprising a vehicle wheel, a knuckle joint and a king pin swingingly mounting said wheel in said knuckle joint, a steering knuckle support having an upper and lower arm and pivotal connections at the ends thereof, and upper and lower control arms connected to said pivotal connections, an axle frame having said control arms pivotally connected thereto and wedge shaped compensators inserted between said pivotal connection to said lower control arm and said axle frame to move said pivotal connection of said lower control arm in relation to said axle frame.

3. In a knee action comprising a vehicle wheel, a knuckle joint and a king pin swingingly mounting said wheel in said knuckle joint, a steering knuckle support having an upper and lower arm and pivotal connections at the ends thereof, and upper and lower control arms connected to said pivotal connections, an axle frame having said control arms pivotally connected thereto and a pair of wedge shaped compensators between the pivotal connection to said lower control arm and the axle frame, one of said compensators having a greater thickness than the other of said compensators.

4. In a knee action comprising a vehicle wheel, a knuckle joint and a king pin swingingly mounting said wheel in said knuckle joint, a steering knuckle support having an upper and lower arm and pivotal connections at the ends thereof and upper and lower control arms connected to said pivotal connections, an axle frame having said control arms pivotally connected thereto and a pair of wedge shaped compensators between the pivotal connection to said lower control arm and the axle frame to tilt said pivotal connection to adjust the camber of said wheel.

5. In a knee action comprising a vehicle wheel, a knuckle joint and a king pin swingingly mounting said wheel in said knuckle joint, a steering knuckle support having an upper and lower arm and pivotal connections at the ends thereof and upper and lower control arms connected to said pivotal connections, an axle frame having said control arms pivotally connected thereto and a wedge shaped compensator between the pivotal connection to said lower control arm and the axle frame, one end of said compensators being thicker than the other to separate one end of said pivotal connection a greater distance than the other end thereof from said axle frame to adjust the caster of said wheel.

6. In a knee action for vehicle wheels, an axle frame, upper and lower control arms swingingly secured to said axle frame and a knuckle joint swingingly secured to said upper and lower control arms and revolvably mounting said vehicle wheel, and compensators having unparallel opposed faces and positioned between said axle frame and the securement of said upper control arm, one of said faces being held in contact with said swinging securement and the other of said faces being held in contact with said axle frame to change the position of the swinging securement of said upper control arm in relation to said axle frame.

7. In a knee action for vehicle wheels, an axle frame, upper and lower control arms swingingly secured to said axle frame and a knuckle joint swingingly secured to said upper and lower control arms and revolvably mounting said vehicle wheel, compensators having unparallel opposed faces and positioned between said axle frame and the lower securement of said lower control arm, one of said faces being held in contact with said securement and the other face being held in contact with said axle frame to change the position of the swinging securement of said lower control arm in relation to said axle frame.

8. In a device for changing the camber of vehicle wheels, a knee action, an axle frame and pivotal securing means connecting said knee action to said axle frame, and a wedge shaped compensator secured between said axle frame and said securing means changing the position of the pivot of said securing means.

9. In a device for changing the caster of vehicle wheels, a knee action, an axle frame and pivotal securing means connecting said knee action to said axle frame, and a wedge shaped compensator secured between said axle frame and said securing means changing the position of the pivot of said securing means.

10. In a device for changing the camber of vehicle wheels, a knee action, an axle frame and securing means connecting said knee action to said axle frame, and a compensator positioned between said securing means and said axle frame and having studs on its upper and lower surface, said studs on the upper surface being out of axial alignment with the studs on the lower surface, said compensator thereby changing the position of securement of said knee action to said axle frame.

11. In a device for changing the camber of vehicle wheels, a knee action, an axle frame and securing means connecting said knee action to said axle frame, and a compensator positioned between said securing means and said axle frame, said compensator securing said knee action to said axle frame having studs on its opposed surfaces and offset out of axial alignment.

12. In a device for changing the camber of vehicle wheels, a knee action, an axle frame and securing means pivotally connecting said knee action to said axle frame, and a compensator having unparallel upper and lower surfaces, one of the surfaces of said compensator being secured to the surface of said axle frame and the other of the surfaces of said compensator being secured to said securing means whereby said compensator is disposed between said axle frame and said pivotal securing means, said compensator being adapted to change the position of the pivot of said pivotal connection in relation to said axle frame.

13. In a device for changing the camber of vehicle wheels, a knee action, an axle frame and pivotal securing means connecting said knee action to said axle frame, and a compensator having wedge shaped opposed surfaces detachably secured to said axle frame and said knee action between said pivotal securing means and said axle frame.

14. In a knee action for vehicle wheels, a vehicle chassis, pivotal connections secured to said chassis connecting said knee action thereto, compensators detachably securing said knee action to said chassis, said compensators having studs on the opposed surfaces thereof, said compensators positioned between said chassis and the pivotal connection to said knee action.

15. In a knee action for vehicle wheels, a vehicle chassis, pivotal connecting means to said chassis for said knee action, a compensator between said chassis and said connecting means tilting said connecting means in relation to said chassis to adjust the caster or camber of said vehicle wheel, said compensator having wedge shaped surfaces tilting said connecting means in relation to said chassis.

16. In a knee action for vehicle wheels, a vehicle chassis, pivotal connections securing said knee action to said chassis, compensators disposed between said pivotal connections and said chassis detachably securing said knee action to said chassis and means changing the position of said knee action relative to said chassis comprising studs on the opposed surfaces of said compensators, said studs offset out of axial alignment.

17. In a knee action for vehicle wheels, a vehicle chassis, a compensator detachably securing said knee action to said chassis having studs on its upper and lower surfaces disposed out of axial alignment one above the other.

18. In a knee action for vehicle wheels, a vehicle chassis, pivotal connections to said chassis for said knee action, a compensator detachably securing said knee action to said chassis having studs on its upper and lower surfaces disposed out of axial alignment one above the other whereby the pivotal connections for said knee action may be adjusted in relation to said chassis.

BIAGIS CASTIGLIA.